United States Patent
Seltzer

(10) Patent No.: US 10,955,521 B2
(45) Date of Patent: *Mar. 23, 2021

(54) LOCATION BASED WIRELESS PET CONTAINMENT SYSTEM USING SINGLE BASE UNIT

(71) Applicant: Radio Systems Corporation, Knoxville, TN (US)

(72) Inventor: Richard Seltzer, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,420

(22) Filed: Dec. 16, 2019

(65) Prior Publication Data

US 2020/0225312 A1 Jul. 16, 2020

Related U.S. Application Data

(63) Continuation of application No. 16/003,876, filed on Jun. 8, 2018, now Pat. No. 10,514,439.

(Continued)

(51) Int. Cl.
| | |
|---|---|
| *H04W 24/00* | (2009.01) |
| *G01S 5/06* | (2006.01) |
| *A01K 11/00* | (2006.01) |
| *A01K 27/00* | (2006.01) |
| *G01S 3/46* | (2006.01) |
| *G08B 13/14* | (2006.01) |
| *G01S 13/82* | (2006.01) |

(52) U.S. Cl.
CPC .............. *G01S 5/06* (2013.01); *A01K 11/008* (2013.01); *A01K 27/009* (2013.01); *G01S 3/46* (2013.01); *G01S 13/825* (2013.01); *G08B 13/1427* (2013.01)

(58) Field of Classification Search
CPC . G01S 5/06; G01S 3/46; G01S 13/825; A01K 11/008; A01K 27/009; G08B 13/1427
See application file for complete search history.

(56) References Cited

U.S. PATENT DOCUMENTS

| | | |
|---|---|---|
| 2,364,994 A | 12/1944 | Moore |
| 2,741,224 A | 4/1956 | Putnam |
| (Continued) | | |

FOREIGN PATENT DOCUMENTS

| | | |
|---|---|---|
| CN | 101112181 A | 1/2008 |
| CN | 101937015 A | 1/2011 |
| (Continued) | | |

OTHER PUBLICATIONS

Baba A.I., et al., "Calibrating Time of Flight in Two Way Ranging," IEEE Xplore Digital Library, Dec. 2011, pp. 393-397.

(Continued)

*Primary Examiner* — Barry W Taylor
(74) *Attorney, Agent, or Firm* — Baker, Donelson, Bearman, Caldwell & Berkowitz PC

(57) ABSTRACT

A wireless animal location system is provided that identifies a location of a pet roaming within an environment using a single base unit. The wireless animal location system tracks and manages animal behavior in the environment using information of pet location.

19 Claims, 12 Drawing Sheets

Related U.S. Application Data

(60) Provisional application No. 62/599,248, filed on Dec. 15, 2017.

(56) References Cited

U.S. PATENT DOCUMENTS

| | | | |
|---|---|---|---|
| 3,182,211 A | 5/1965 | Maratuech | |
| 3,184,730 A | 5/1965 | Irish | |
| 3,500,373 A | 3/1970 | Arthur | |
| 3,735,757 A | 5/1973 | MacFarland | |
| 4,180,013 A | 12/1979 | Smith | |
| 4,426,884 A | 1/1984 | Polchaninoff | |
| 4,783,646 A | 11/1988 | Matsuzaki | |
| 4,794,402 A | 12/1988 | Gonda et al. | |
| 4,802,482 A | 2/1989 | Gonda et al. | |
| 4,947,795 A | 8/1990 | Farkas | |
| 4,969,418 A | 11/1990 | Jones | |
| 5,054,428 A | 10/1991 | Farkus | |
| 5,159,580 A | 10/1992 | Andersen et al. | |
| 5,161,485 A | 11/1992 | McDade | |
| 5,182,032 A | 1/1993 | Dickie et al. | |
| 5,207,178 A | 5/1993 | McDade et al. | |
| 5,207,179 A | 5/1993 | Arthur et al. | |
| 5,526,006 A | 6/1996 | Akahane et al. | |
| 5,559,498 A | 9/1996 | Westrick et al. | |
| 5,576,972 A | 11/1996 | Harrison | |
| 5,586,521 A | 12/1996 | Kelley | |
| 5,601,054 A | 2/1997 | So | |
| 5,642,690 A | 7/1997 | Calabrese et al. | |
| 5,794,569 A | 8/1998 | Titus et al. | |
| 5,815,077 A | 9/1998 | Christiansen | |
| 5,844,489 A | 12/1998 | Yarnall, Jr. et al. | |
| 5,857,433 A | 1/1999 | Files | |
| 5,870,029 A | 2/1999 | Otto et al. | |
| 5,872,516 A | 2/1999 | Bonge, Jr. | |
| 5,886,669 A | 3/1999 | Kita | |
| 5,913,284 A | 6/1999 | Van Curen et al. | |
| 5,923,254 A | 7/1999 | Brune | |
| 5,927,233 A | 7/1999 | Mainini et al. | |
| 5,933,079 A | 8/1999 | Frink | |
| 5,934,225 A | 8/1999 | Williams | |
| 5,949,350 A | 9/1999 | Girard et al. | |
| 5,957,983 A | 9/1999 | Tominaga | |
| 5,982,291 A | 11/1999 | Williams et al. | |
| 6,016,100 A | 1/2000 | Boyd et al. | |
| 6,019,066 A | 2/2000 | Taylor | |
| 6,028,531 A | 2/2000 | Wanderlich | |
| 6,047,664 A | 4/2000 | Lyerly | |
| 6,067,018 A | 5/2000 | Skelton et al. | |
| 6,075,443 A | 6/2000 | Schepps et al. | |
| 6,166,643 A | 12/2000 | Janning et al. | |
| 6,170,439 B1 | 1/2001 | Duncan et al. | |
| 6,184,790 B1 | 2/2001 | Gerig | |
| 6,196,990 B1 | 3/2001 | Zicherman | |
| 6,204,762 B1 | 3/2001 | Dering et al. | |
| 6,215,314 B1 | 4/2001 | Frankewich, Jr. | |
| 6,230,031 B1 | 5/2001 | Barber | |
| 6,230,661 B1 | 5/2001 | Yarnall, Jr. et al. | |
| 6,232,880 B1 | 5/2001 | Anderson et al. | |
| 6,271,757 B1 | 8/2001 | Touchton et al. | |
| 6,327,999 B1 | 12/2001 | Gerig | |
| 6,353,390 B1 | 3/2002 | Beri et al. | |
| 6,360,697 B1 | 3/2002 | Williams | |
| 6,360,698 B1 | 3/2002 | Stapelfeld et al. | |
| 6,404,338 B1 | 6/2002 | Koslar | |
| 6,415,742 B1 | 7/2002 | Lee et al. | |
| 6,426,464 B1 | 7/2002 | Spellman et al. | |
| 6,427,079 B1 | 7/2002 | Schneider et al. | |
| 6,431,121 B1 | 8/2002 | Mainini et al. | |
| 6,431,122 B1 | 8/2002 | Westrick et al. | |
| 6,441,778 B1 | 8/2002 | Durst et al. | |
| 6,459,378 B2 | 10/2002 | Gerig | |
| 6,487,992 B1 | 12/2002 | Hollis | |
| 6,561,137 B2 | 5/2003 | Oakman | |
| 6,581,546 B1 | 6/2003 | Dalland et al. | |
| 6,588,376 B1 | 7/2003 | Groh | |
| 6,598,563 B2 | 7/2003 | Kim et al. | |
| 6,600,422 B2 | 7/2003 | Barry et al. | |
| 6,637,376 B2 | 10/2003 | Lee et al. | |
| 6,657,544 B2 | 12/2003 | Barry et al. | |
| 6,668,760 B2 | 12/2003 | Groh et al. | |
| 6,700,492 B2 | 3/2004 | Touchton et al. | |
| 6,747,555 B2 | 6/2004 | Fellenstein et al. | |
| 6,798,887 B1 | 9/2004 | Andre | |
| 6,799,537 B1 | 10/2004 | Liao | |
| 6,807,720 B2 | 10/2004 | Brune et al. | |
| 6,820,025 B2 | 11/2004 | Bachmann et al. | |
| 6,825,768 B2 | 11/2004 | Stapelfeld et al. | |
| 6,830,012 B1 | 12/2004 | Swan | |
| 6,833,790 B2 | 12/2004 | Mejia et al. | |
| 6,874,447 B1 | 4/2005 | Kobett | |
| 6,888,502 B2 | 5/2005 | Beigel et al. | |
| 6,901,883 B2 | 6/2005 | Gillis et al. | |
| 6,903,682 B1 | 6/2005 | Maddox | |
| 6,907,844 B1 | 6/2005 | Crist et al. | |
| 6,907,883 B2 | 6/2005 | Lin | |
| 6,921,089 B2 | 7/2005 | Groh et al. | |
| 6,923,146 B2 | 8/2005 | Korbitz et al. | |
| 6,928,958 B2 | 8/2005 | Crist et al. | |
| 6,937,647 B1 | 8/2005 | Boyd et al. | |
| 6,956,483 B2 | 10/2005 | Schmitt et al. | |
| 6,970,090 B1 | 11/2005 | Sciarra | |
| 7,061,385 B2 | 6/2006 | Fong et al. | |
| 7,079,024 B2 | 7/2006 | Alarcon et al. | |
| 7,114,466 B1 | 10/2006 | Mayer | |
| 7,142,167 B2 | 11/2006 | Rochelle et al. | |
| 7,164,354 B1 | 1/2007 | Panzer | |
| 7,173,535 B2 | 2/2007 | Bach et al. | |
| 7,198,009 B2 | 4/2007 | Crist et al. | |
| 7,222,589 B2 | 5/2007 | Lee et al. | |
| 7,249,572 B2 | 7/2007 | Goetzl et al. | |
| 7,252,051 B2 | 8/2007 | Napolez et al. | |
| 7,259,718 B2 | 8/2007 | Patterson et al. | |
| 7,267,081 B2 | 9/2007 | Steinbacher | |
| 7,275,502 B2 | 10/2007 | Boyd et al. | |
| 7,296,540 B2 | 11/2007 | Boyd | |
| 7,319,397 B2 | 1/2008 | Chung et al. | |
| 7,328,671 B2 | 2/2008 | Kates | |
| 7,339,474 B2 | 3/2008 | Easley et al. | |
| 7,382,328 B2 | 6/2008 | Lee, IV et al. | |
| 7,394,390 B2 | 7/2008 | Gerig | |
| 7,395,966 B2 | 7/2008 | Braiman | |
| 7,404,379 B2 | 7/2008 | Nottingham et al. | |
| 7,411,492 B2 | 8/2008 | Greenberg et al. | |
| 7,426,906 B2 | 9/2008 | Nottingham et al. | |
| 7,434,541 B2 | 10/2008 | Kates | |
| 7,443,298 B2 | 10/2008 | Cole et al. | |
| 7,477,155 B2 | 1/2009 | Bach et al. | |
| 7,503,285 B2 | 3/2009 | Mainini et al. | |
| 7,518,275 B2 | 4/2009 | Suzuki et al. | |
| 7,518,522 B2 | 4/2009 | So et al. | |
| 7,538,679 B2 | 5/2009 | Shanks | |
| 7,546,817 B2 | 6/2009 | Moore | |
| 7,552,699 B2 | 6/2009 | Moore | |
| 7,559,291 B2 | 7/2009 | Reinhart | |
| 7,562,640 B2 | 7/2009 | Lalor | |
| 7,565,885 B2 | 7/2009 | Moore | |
| 7,574,979 B2 | 8/2009 | Nottingham et al. | |
| 7,583,931 B2 | 9/2009 | Eu et al. | |
| 7,602,302 B2 | 10/2009 | Hokuf et al. | |
| 7,612,668 B2 | 11/2009 | Harvey | |
| 7,616,124 B2 | 11/2009 | Paessel et al. | |
| 7,656,291 B2 | 2/2010 | Rochelle et al. | |
| 7,658,166 B1 | 2/2010 | Rheinschmidt, Jr. et al. | |
| 7,667,599 B2 | 2/2010 | Mainini et al. | |
| 7,667,607 B2 | 2/2010 | Gerig et al. | |
| 7,680,645 B2 | 3/2010 | Li et al. | |
| 7,705,736 B1 | 4/2010 | Kedziora | |
| 7,710,263 B2 | 5/2010 | Boyd | |
| 7,760,137 B2 | 7/2010 | Martucci et al. | |
| 7,779,788 B2 | 8/2010 | Moore | |
| 7,786,876 B2 | 8/2010 | Troxler et al. | |
| 7,804,724 B2 | 9/2010 | Way | |
| 7,814,865 B2 | 10/2010 | Tracy et al. | |
| 7,828,221 B2 | 11/2010 | Kwon, II | |

(56) References Cited

U.S. PATENT DOCUMENTS

| | | |
|---|---|---|
| 7,830,257 B2 | 11/2010 | Hassell |
| 7,834,769 B2 | 11/2010 | Hinkle et al. |
| 7,841,301 B2 | 11/2010 | Mainini et al. |
| 7,856,947 B2 | 12/2010 | Giunta |
| 7,864,057 B2 | 1/2011 | Milnes et al. |
| 7,868,912 B2 | 1/2011 | Venetianer et al. |
| 7,900,585 B2 | 3/2011 | Lee et al. |
| 7,918,190 B2 | 4/2011 | Belcher et al. |
| 7,944,359 B2 | 5/2011 | Fong et al. |
| 7,946,252 B2 | 5/2011 | Lee, IV et al. |
| 7,978,078 B2 | 7/2011 | Copeland et al. |
| 7,996,983 B2 | 8/2011 | Lee et al. |
| 8,011,327 B2 | 9/2011 | Mainini et al. |
| 8,047,161 B2 | 11/2011 | Moore et al. |
| 8,049,630 B2 | 11/2011 | Chao et al. |
| 8,065,978 B2 | 11/2011 | Duncan et al. |
| 8,069,823 B2 | 12/2011 | Mainini et al. |
| 8,098,164 B2 | 1/2012 | Gerig et al. |
| 8,159,355 B2 | 4/2012 | Gerig et al. |
| 8,161,915 B2 | 4/2012 | Kim |
| 8,185,345 B2 | 5/2012 | Mainini |
| 8,232,909 B2 | 7/2012 | Kroeger et al. |
| 8,240,085 B2 | 8/2012 | Hill |
| 8,269,504 B2 | 9/2012 | Gerig |
| 8,274,396 B2 | 9/2012 | Gurley et al. |
| 8,297,233 B2 | 10/2012 | Rich et al. |
| 8,342,134 B2 | 1/2013 | Lee et al. |
| 8,342,135 B2 | 1/2013 | Peinetti et al. |
| 8,430,064 B2 | 4/2013 | Groh et al. |
| 8,436,735 B2 | 5/2013 | Mainini et al. |
| 8,447,510 B2 | 5/2013 | Fitzpatrick et al. |
| 8,451,130 B2 | 5/2013 | Mainini |
| 8,456,296 B2 | 6/2013 | Piltonen et al. |
| 8,483,262 B2 | 7/2013 | Mainini et al. |
| 8,714,113 B2 | 5/2014 | Lee, IV et al. |
| 8,715,824 B2 | 5/2014 | Rawlings et al. |
| 8,736,499 B2 | 5/2014 | Goetzl et al. |
| 8,779,925 B2 | 7/2014 | Rich et al. |
| 8,803,692 B2 | 8/2014 | Goetzl et al. |
| 8,807,089 B2 | 8/2014 | Brown et al. |
| 8,823,513 B2 | 9/2014 | Jameson et al. |
| 8,854,215 B1 | 10/2014 | Ellis et al. |
| 8,866,605 B2 | 10/2014 | Gibson |
| 8,908,034 B2 | 12/2014 | Bordonaro |
| 8,917,172 B2 | 12/2014 | Charych |
| 8,947,240 B2 | 2/2015 | Mainini |
| 8,967,085 B2 | 3/2015 | Gillis et al. |
| 9,035,773 B2 | 5/2015 | Petersen et al. |
| 9,125,380 B2 | 9/2015 | Deutsch |
| 9,131,660 B2 | 9/2015 | Womble |
| 9,186,091 B2 | 11/2015 | Mainini et al. |
| 9,204,251 B1 | 12/2015 | Mendelson et al. |
| 9,307,745 B2 | 4/2016 | Mainini |
| 9,861,076 B2 | 1/2018 | Rochelle et al. |
| 10,514,439 B2 * | 12/2019 | Seltzer ................. G01S 5/06 |
| 2002/0010390 A1 | 1/2002 | Guice et al. |
| 2002/0015094 A1 | 2/2002 | Kuwano et al. |
| 2002/0036569 A1 | 3/2002 | Martin |
| 2002/0092481 A1 | 7/2002 | Spooner |
| 2002/0103610 A1 | 8/2002 | Bachmann et al. |
| 2002/0196151 A1 | 12/2002 | Troxler |
| 2003/0034887 A1 | 2/2003 | Crabtree et al. |
| 2003/0035051 A1 | 2/2003 | Cho et al. |
| 2003/0116099 A1 | 6/2003 | Kim et al. |
| 2003/0154928 A1 | 8/2003 | Lee et al. |
| 2003/0169207 A1 | 9/2003 | Beigel et al. |
| 2003/0179140 A1 | 9/2003 | Patterson et al. |
| 2003/0218539 A1 | 11/2003 | Hight |
| 2004/0108939 A1 | 6/2004 | Giunta |
| 2004/0162875 A1 | 8/2004 | Brown |
| 2005/0000469 A1 | 1/2005 | Giunta et al. |
| 2005/0007251 A1 | 1/2005 | Crabtree et al. |
| 2005/0020279 A1 | 1/2005 | Markhovsky et al. |
| 2005/0035865 A1 | 2/2005 | Brennan et al. |
| 2005/0059909 A1 | 3/2005 | Burgess |
| 2005/0066912 A1 | 3/2005 | Korbitz et al. |
| 2005/0081797 A1 | 4/2005 | Laitinen et al. |
| 2005/0139169 A1 | 6/2005 | So et al. |
| 2005/0145196 A1 | 7/2005 | Crist et al. |
| 2005/0145198 A1 | 7/2005 | Crist et al. |
| 2005/0145200 A1 | 7/2005 | Napolez et al. |
| 2005/0172912 A1 | 8/2005 | Crist et al. |
| 2005/0217606 A1 | 10/2005 | Lee et al. |
| 2005/0231353 A1 | 10/2005 | Dipoala et al. |
| 2005/0235924 A1 | 10/2005 | Lee, IV et al. |
| 2005/0258715 A1 | 11/2005 | Schlabach et al. |
| 2005/0263106 A1 | 12/2005 | Steinbacher |
| 2005/0280546 A1 | 12/2005 | Ganley et al. |
| 2005/0288007 A1 | 12/2005 | Benco et al. |
| 2006/0000015 A1 | 1/2006 | Duncan |
| 2006/0011145 A1 | 1/2006 | Kates et al. |
| 2006/0027185 A1 | 2/2006 | Troxler et al. |
| 2006/0092676 A1 | 5/2006 | Liptak et al. |
| 2006/0102100 A1 | 5/2006 | Becker et al. |
| 2006/0102101 A1 | 5/2006 | Kim |
| 2006/0112901 A1 | 6/2006 | Gomez |
| 2006/0191491 A1 | 8/2006 | Nottingham et al. |
| 2006/0196445 A1 | 9/2006 | Kates |
| 2006/0197672 A1 | 9/2006 | Talamas, Jr. et al. |
| 2006/0202818 A1 | 9/2006 | Greenberg et al. |
| 2007/0011339 A1 | 1/2007 | Brown |
| 2007/0103296 A1 | 5/2007 | Paessel et al. |
| 2007/0197878 A1 | 8/2007 | Shklarski |
| 2007/0204803 A1 | 9/2007 | Ramsay |
| 2007/0204804 A1 | 9/2007 | Swanson et al. |
| 2007/0209604 A1 | 9/2007 | Groh et al. |
| 2007/0249470 A1 | 10/2007 | Niva et al. |
| 2007/0266959 A1 | 11/2007 | Brooks et al. |
| 2008/0004539 A1 | 1/2008 | Ross |
| 2008/0017133 A1 | 1/2008 | Moore |
| 2008/0036610 A1 | 2/2008 | Hokuf et al. |
| 2008/0055154 A1 | 3/2008 | Martucci et al. |
| 2008/0055155 A1 | 3/2008 | Hensley et al. |
| 2008/0058670 A1 | 3/2008 | Mainini et al. |
| 2008/0061978 A1 | 3/2008 | Huang |
| 2008/0061990 A1 | 3/2008 | Milnes et al. |
| 2008/0119757 A1 | 5/2008 | Winter |
| 2008/0129457 A1 | 6/2008 | Ritter et al. |
| 2008/0141949 A1 | 6/2008 | Taylor |
| 2008/0143516 A1 | 6/2008 | Mock et al. |
| 2008/0156277 A1 | 7/2008 | Mainini et al. |
| 2008/0163827 A1 | 7/2008 | Goetzl |
| 2008/0163829 A1 | 7/2008 | Lee |
| 2008/0168949 A1 | 7/2008 | Belcher et al. |
| 2008/0168950 A1 | 7/2008 | Moore et al. |
| 2008/0186167 A1 | 8/2008 | Ramachandra |
| 2008/0186197 A1 | 8/2008 | Rochelle et al. |
| 2008/0204322 A1 | 8/2008 | Oswald et al. |
| 2008/0216766 A1 | 9/2008 | Martin et al. |
| 2008/0236514 A1 | 10/2008 | Johnson et al. |
| 2008/0252527 A1 | 10/2008 | Garcia |
| 2008/0272908 A1 | 11/2008 | Boyd |
| 2009/0000566 A1 | 1/2009 | Kim |
| 2009/0002188 A1 | 1/2009 | Greenberg |
| 2009/0012355 A1 | 1/2009 | Lin |
| 2009/0020002 A1 | 1/2009 | Williams et al. |
| 2009/0025651 A1 | 1/2009 | Lalor |
| 2009/0031966 A1 | 2/2009 | Kates |
| 2009/0061772 A1 | 3/2009 | Moon et al. |
| 2009/0082830 A1 | 3/2009 | Folkerts et al. |
| 2009/0102668 A1 | 4/2009 | Thompson et al. |
| 2009/0112284 A1 | 4/2009 | Smith et al. |
| 2009/0224909 A1 | 9/2009 | Derrick et al. |
| 2009/0239586 A1 | 9/2009 | Boeve et al. |
| 2009/0289785 A1 | 11/2009 | Leonard |
| 2009/0289844 A1 | 11/2009 | Palsgrove et al. |
| 2010/0008011 A1 | 1/2010 | Ogram |
| 2010/0033339 A1 | 2/2010 | Gurley et al. |
| 2010/0047119 A1 | 2/2010 | Cressy |
| 2010/0049364 A1 | 2/2010 | Landry et al. |
| 2010/0050954 A1 | 3/2010 | Lee, IV et al. |
| 2010/0107985 A1 | 5/2010 | O'Hare |
| 2010/0139576 A1 | 6/2010 | Kim et al. |
| 2010/0154721 A1 | 6/2010 | Gerig et al. |

(56) References Cited

U.S. PATENT DOCUMENTS

| | | |
|---|---|---|
| 2010/0231391 A1 | 9/2010 | Dror et al. |
| 2010/0238022 A1 | 9/2010 | Au et al. |
| 2010/0315241 A1 | 12/2010 | Jow |
| 2011/0140967 A1 | 6/2011 | Lopez et al. |
| 2012/0000431 A1 | 1/2012 | Khoshkish et al. |
| 2012/0006282 A1 | 1/2012 | Kates |
| 2012/0037088 A1 | 2/2012 | Altenhofen |
| 2012/0078139 A1 | 3/2012 | Aldridge et al. |
| 2012/0132151 A1 | 5/2012 | Touchton et al. |
| 2012/0165012 A1 | 6/2012 | Fischer et al. |
| 2012/0188370 A1 | 7/2012 | Bordonaro |
| 2012/0236688 A1 | 9/2012 | Spencer et al. |
| 2012/0312250 A1 | 12/2012 | Jesurum |
| 2013/0099920 A1 | 4/2013 | Song et al. |
| 2013/0099922 A1 | 4/2013 | Lohbihler |
| 2013/0141237 A1 | 6/2013 | Goetzl et al. |
| 2013/0157564 A1 | 6/2013 | Curtis et al. |
| 2013/0169441 A1 | 7/2013 | Wilson |
| 2013/0298846 A1 | 11/2013 | Mainini |
| 2013/0321159 A1 | 12/2013 | Schofield et al. |
| 2014/0020635 A1 | 1/2014 | Sayers et al. |
| 2014/0053788 A1 | 2/2014 | Riddell |
| 2014/0062695 A1 | 3/2014 | Rosen et al. |
| 2014/0069350 A1 | 3/2014 | Riddell |
| 2014/0073939 A1 | 3/2014 | Rodriguez-Llorente et al. |
| 2014/0120943 A1 | 5/2014 | Shima |
| 2014/0123912 A1 | 5/2014 | Menkes et al. |
| 2014/0132608 A1 | 5/2014 | Mund et al. |
| 2014/0174376 A1 | 6/2014 | Touchton et al. |
| 2014/0228649 A1 | 8/2014 | Rayner et al. |
| 2014/0228927 A1 | 8/2014 | Ahmad et al. |
| 2014/0253368 A1* | 9/2014 | Holder .............. G01S 7/354 342/146 |
| 2014/0253389 A1 | 9/2014 | Beauregard |
| 2014/0261235 A1 | 9/2014 | Rich et al. |
| 2014/0267299 A1 | 9/2014 | Couse |
| 2014/0275824 A1 | 9/2014 | Couse et al. |
| 2014/0276278 A1 | 9/2014 | Smith et al. |
| 2014/0307888 A1 | 10/2014 | Alderson et al. |
| 2014/0320347 A1 | 10/2014 | Rochelle et al. |
| 2014/0343599 A1 | 11/2014 | Smith et al. |
| 2015/0040840 A1 | 2/2015 | Muetzel et al. |
| 2015/0043744 A1 | 2/2015 | Lagodzinski et al. |
| 2015/0053144 A1 | 2/2015 | Bianchi et al. |
| 2015/0075446 A1 | 3/2015 | Hu |
| 2015/0080013 A1 | 3/2015 | Venkatraman et al. |
| 2015/0107531 A1 | 4/2015 | Golden |
| 2015/0149111 A1 | 5/2015 | Kelly et al. |
| 2015/0163412 A1 | 6/2015 | Holley et al. |
| 2015/0172872 A1 | 6/2015 | Alsehly et al. |
| 2015/0173327 A1 | 6/2015 | Gerig et al. |
| 2015/0199490 A1 | 7/2015 | Iancu et al. |
| 2015/0223013 A1 | 8/2015 | Park et al. |
| 2015/0289111 A1 | 10/2015 | Ozkan et al. |
| 2015/0350848 A1 | 12/2015 | Eramian |
| 2015/0358768 A1 | 12/2015 | Luna et al. |
| 2016/0015005 A1 | 1/2016 | Brown, Jr. et al. |
| 2016/0021506 A1 | 1/2016 | Bonge, Jr. |
| 2016/0021850 A1 | 1/2016 | Stapelfeld et al. |
| 2016/0029466 A1 | 1/2016 | Demao et al. |
| 2016/0044444 A1 | 2/2016 | Rattner et al. |
| 2016/0084801 A1 | 3/2016 | Robinson et al. |
| 2016/0094419 A1 | 3/2016 | Peacock et al. |
| 2016/0102879 A1 | 4/2016 | Guest et al. |
| 2016/0150362 A1 | 5/2016 | Shaprio et al. |
| 2016/0174099 A1 | 6/2016 | Goldfain |
| 2016/0178392 A1 | 6/2016 | Goldfain |
| 2016/0187454 A1 | 6/2016 | Orman et al. |
| 2016/0253987 A1 | 9/2016 | Chattell |
| 2016/0335917 A1 | 11/2016 | Lydecker et al. |
| 2016/0363664 A1 | 12/2016 | Mindell et al. |
| 2017/0212205 A1* | 7/2017 | Bialer ................ G01S 7/03 |
| 2017/0323630 A1 | 11/2017 | Stickney et al. |
| 2018/0027772 A1 | 2/2018 | Gordon et al. |
| 2018/0077509 A1 | 3/2018 | Jones et al. |
| 2018/0078735 A1 | 3/2018 | Dalgleish et al. |
| 2018/0094451 A1 | 4/2018 | Peter et al. |
| 2018/0188351 A1 | 7/2018 | Jones et al. |
| 2018/0210704 A1 | 7/2018 | Jones et al. |
| 2018/0234134 A1 | 8/2018 | Tang et al. |
| 2018/0235182 A1 | 8/2018 | Bocknek |
| 2018/0315262 A1 | 11/2018 | Love et al. |
| 2019/0013003 A1 | 1/2019 | Baughman et al. |
| 2019/0110430 A1 | 4/2019 | Badiou |
| 2019/0165832 A1 | 5/2019 | Khanduri et al. |

FOREIGN PATENT DOCUMENTS

| | | |
|---|---|---|
| CN | 101112181 B | 11/2012 |
| CN | 102793568 B | 12/2014 |
| JP | H0974774 A | 3/1997 |
| KR | 20130128704 A | 11/2013 |
| WO | WO-02060240 A3 | 2/2003 |
| WO | WO-2006000015 A1 | 1/2006 |
| WO | WO-2008085812 A2 | 7/2008 |
| WO | WO-2008140992 A1 | 11/2008 |
| WO | WO-2009105243 A2 | 8/2009 |
| WO | WO-2009106896 A2 | 9/2009 |
| WO | WO-2011055004 A1 | 5/2011 |
| WO | WO-2011136816 A1 | 11/2011 |
| WO | WO-2012122607 A1 | 9/2012 |
| WO | WO-2015015047 A1 | 2/2015 |
| WO | WO-2016204799 A1 | 12/2016 |

OTHER PUBLICATIONS

Eileen—How to Protect Your Dog From Loud and Scary Sounds (Year: 2013).

Extended European Search Report for Application No. EP17180645, dated May 9, 2018, 7 pages.

Extended European Search Report for European Application No. 11784149.4 dated Nov. 17, 2017, 7 pages.

Extended European Search Report for European Application No. 15735439.0 dated Oct. 18, 2017, 9 pages.

Extended European Search Report for European Application No. 15895839.7 dated Oct. 9, 2018, 5 pages.

Extended European Search Report for European Application No. 17162289.7 dated Aug. 31, 2017, 7 pages.

High Tech Products, Inc: "Human Contain Model X-10 Rechargeable Muti-function Electronic Dog Fence Ultra-system", Internet citation, Retrieved from the Internet: URL:http://web.archive.org/web/20120112221915/http://hightechpet.com/user_Manuals/HC%20X-10_Press.pdf retrieved on Apr. 10, 2017], Apr. 28, 2012, pp. 1-32, XP008184171.

International Preliminary Report for Patentability Chapter II for International Application No. PCT/US2014/024875 dated Mar. 12, 2015, 17 pages.

International Preliminary Report on Patentability for Application No. PCT/US2015/043653 dated Dec. 19, 2017, 14 pages.

International Search Report and Written Opinion for Application No. PCT/US2018/013737 dated Mar. 7, 2018, 8 pages.

International Search Report and Written Opinion for Application No. PCT/US2018/013738 dated Mar. 20, 2018, 6 pages.

International Search Report and Written Opinion for Application No. PCT/US2018/013740 dated Mar. 20, 2018, 6 pages.

International Search Report and Written Opinion for Application No. PCT/US2018/019887 dated May 8, 2018, 10 pages.

International Search Report and Written Opinion for International Application No. PCT/US2014/024875 dated Jun. 27, 2014, 12 pages.

International Search Report for International Application No. PCT/US2014/020344 dated Jun. 5, 2014, 2 pages.

International Search Report for International Application No. PCT/US2014/066650 dated Feb. 19, 2015, 3 pages (Outgoing).

International Search Report for International Application No. PCT/US2015/010864, Form PCT/ISA/210 dated Apr. 13, 2015, 2 pages.

International Search Report for International Application No. PCT/US2015/043653, Form PCT/ISA/210 dated Oct. 23, 2015, 2 pages.

(56) References Cited

OTHER PUBLICATIONS

Notification of Transmittal of the International Search Report and the Written Opinion of the International Searching Authority for International Application No. PCT/US2015/043653, Form PCT/ISA/220 dated Oct. 23, 2015, 1 page.
Notification of Transmittal of the International Search Report and Written Opinion for the International Application No. PCT/US2014/066650 dated Feb. 19, 2015, 1 page.
Welch et al., "An Introduction to the Kalman Filter," Department of Computer Science, Jul. 24, 2006, pp. 1-16.
Written Opinion for International Application No. PCT/US2014/066650 dated Feb. 19, 2015, 15 pages(outgoing).
Written Opinion for International Application No. PCT/US2015/043653, Form PCT/ISA/237 dated Oct. 23, 2015, 13 pages.
Written Opinion of the International Application No. PCT/US2015/010864, Form PCT/ISA/237 dated Apr. 13, 2015, 6 pages.

\* cited by examiner

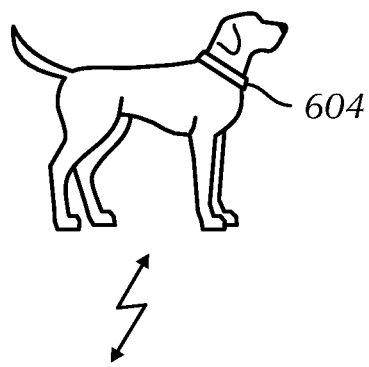
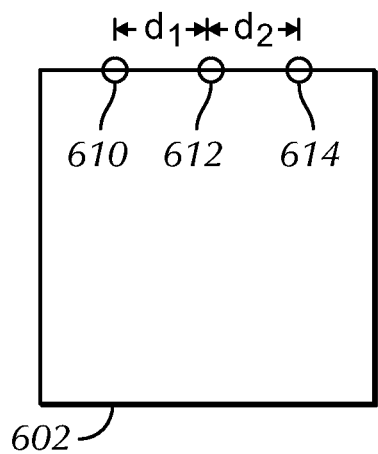
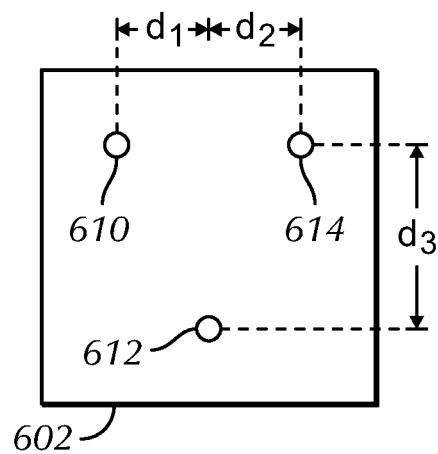
FIG. 6A
FIG. 6B

LOCATION BASED WIRELESS PET CONTAINMENT SYSTEM USING SINGLE BASE UNIT

RELATED APPLICATIONS

This application is a continuation application of U.S. application Ser. No. 16/003,876, filed Jun. 8, 2018, which claims the benefit of U.S. Application No. 62/599,248, filed Dec. 15, 2017.

TECHNICAL FIELD

The disclosure herein involves identifying a location of a roaming object in an environment using wireless communications.

BACKGROUND

Systems and methods have been developed for identifying a location of a roaming object in an environment using wireless communications among multiple base units tracking the object.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 6A shows a transceiver of a pet collar communicating with a single base unit, under an embodiment.

FIG. 6B shows a top down view of a single base unit, under an embodiment

DETAILED DESCRIPTION

A wireless animal location system is provided that identifies a location of a pet roaming within an environment and tracks/manages animal behavior in the environment using information of pet location. The wireless pet location system (or containment system) may disallow access to an area within an environment by applying a negative stimulus when an animal enters a prohibited location. For example, the system may apply a negative stimulus when an animal approaches a pantry space or waste collection space. Conversely, the system may allow the animal free and unimpeded access to other portions of the environment. For example, the system may forgo adverse stimulus when the animal is in desired locations such as animal bedding areas or dedicated animal play areas. The system may simply log an event in order to compile information regarding the animal's behavior. For example, the system may detect and log the presence of the animal near a watering bowl. Further the system may report such information to mobile applications allowing pet owners to monitor and track animal behavior in a home.

An RF-based wireless pet location system may utilize signal strength, two way ranging techniques, and/or time difference of arrival (techniques) to locate a target.

A signal strength based approach uses Received Signal Strength Indicator (RSSI) values to determine the range between a roaming target and three or more spatially separated base units. The target or animal may wear a transceiver housed within a collar. The transceiver may receive and send RF signals to base units. Under an embodiment, three base units within the target's environment periodically transmit RF signals. The pet transceiver estimates its distance from each base unit using the strength of the corresponding RF communication received from each of the base units, i.e. using RSSI values. Based on the multiple ranging measurements, and a known location of the base units within a grid system, a single location may be resolved within the grid system.

Figure 1:
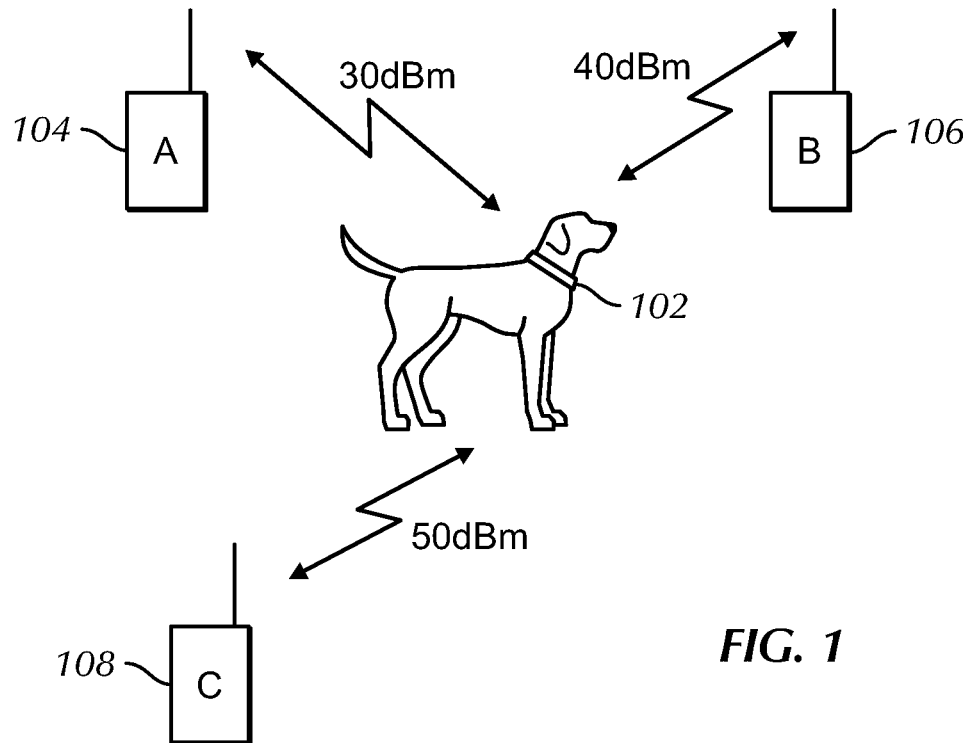
FIG. 1 shows a transceiver of a pet collar communicating with base units, under an embodiment.
Figure 2:
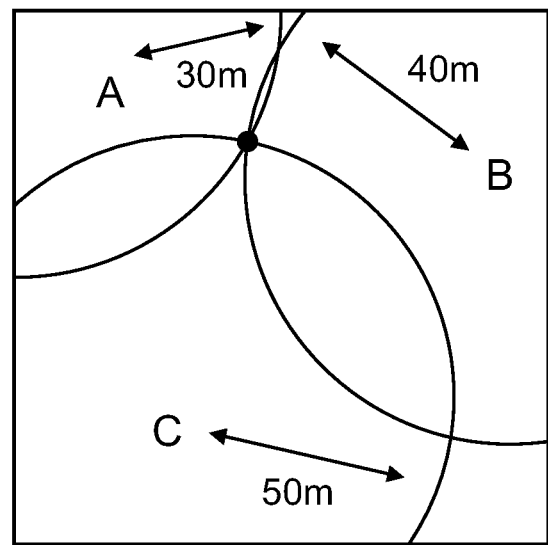
FIG. 2 shows a method of trilateration, under an embodiment.

FIG. 1 shows an animal worn transceiver 102 in range of three transmitting base units 104, 106, 108. The transceiver 102 communicates with base unit 104, base unit 106, and base unit 108. Based on measured RSSI values, the animal worn collar determines an approximate range from pet to base 104 (−30 dBm, 30 meters), from pet to base 106 (−40 dBm, 40 meters), and from pet to base 108 (−50 dBm, 50 meters). FIG. 2 shows a trilateration method which uses information of the three radii (i.e., distances from transceiver to base units) to identify the location of the pet as a point of intersection between three circles. In other words, base units 104, 106, 108 become center points A, B, C of circles with respective radii of 30 m, 40 m, and 50 m. Since locations of the base units are known within a grid system, the circles intersect at a grid location corresponding to the pet transceiver location. The grid system is established and linked to absolute positions at time of system set-up.

This system requires at least three base units. This complicates the system as an outdoor installation needs to power any unit that is remote to an AC power source. This likely requires that one or more of the base units operate on underground wires or DC power, which is inconvenient if rechargeable, or expensive if primary cells are used. Also, the inclusion of three base units greatly increases the cost of a system. Further, the resultant location is not precise due to the variation of each signal strength determination due to environmental conditions and antenna pattern variation.

A wireless animal location system may use two way ranging (TWR) to determine and monitor animal location under an embodiment. The system may comprise a transceiver housed by a collar worn by an animal and three or more base units distributed in the monitored environment. The system determines the range between the animal target (i.e., animal collar) and the three or more spatially separated base units based on TWR of an RF signal between the target and each of the base units. Based on the multiple time of flight measurements between the collar transceiver and known locations of the base units within a grid system, a single location may be resolved within the grid system.

Figure 3:
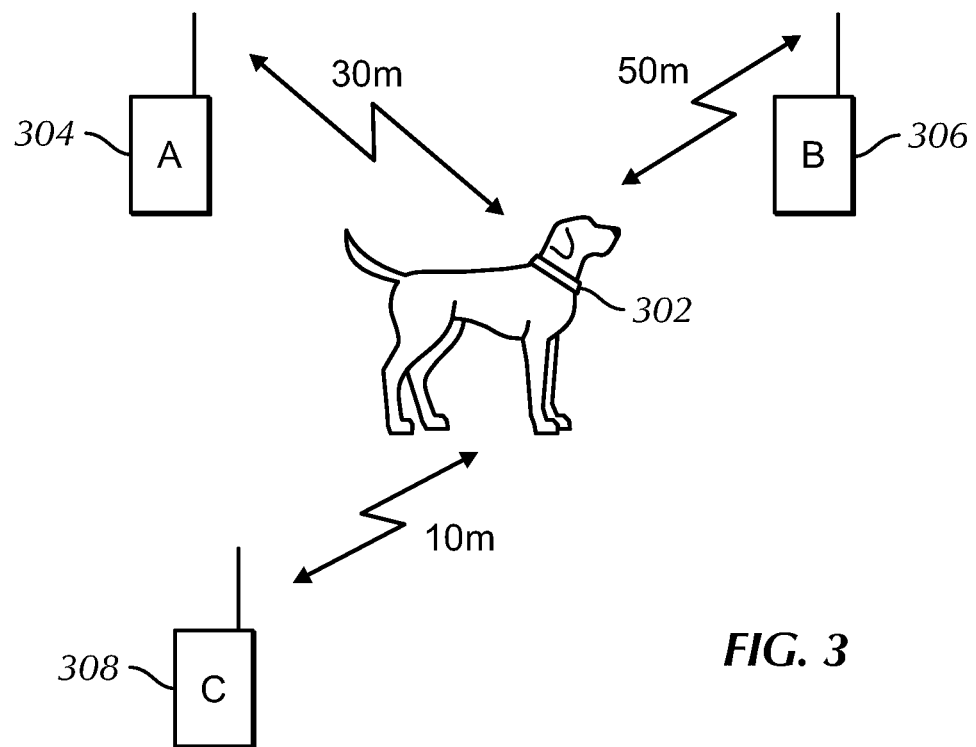
FIG. 3 shows a transceiver of a pet collar communicating with base units, under an embodiment.
Figure 4:
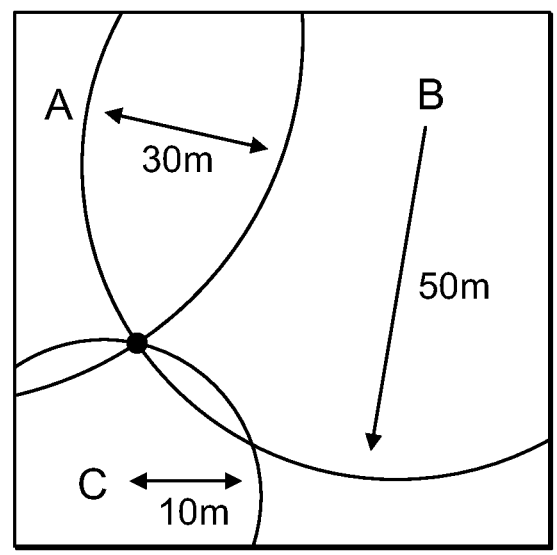
FIG. 4 shows a method of trilateration, under an embodiment.

FIG. 3 shows an animal worn transceiver 302 in range of three transmitting base units 304, 306, 308. The pet transceiver 302 communicates with base unit 304, base unit 306, and base unit 308. During each two way communication, the pet transceiver uses time of flight to determine a range to each base unit. For example. the pet transceiver sends a communication at time $t=t_0=0$. A base unit may process the communication and send a return communication at time $t=t_1$. The pet transceiver (i.e. pet collar) receives the return communication and records the receipt of the communication's first pulse at time $t=t_2$. The time of flight is then computed as ($t_2$–processing time)/2. This time of flight corresponds to a distance. Based on such time of flight calculations, the animal worn collar determines an approximate range from pet to base 304 (30 meters), from pet to base 306 (50 meters), and from pet to base 308 (10 meters). FIG. 4 shows a trilateration method which uses information of the three radii (i.e., distances from transceiver to base units) to identify the location of the pet as a point of intersection between three circles. In other words, base units 304, 306, 308 become center points A, B, C of circles with respective radii of 30 m, 50 m, and 10 m. Since locations of the base units are known within a grid system, the circles intersect at a grid location corresponding to the pet transceiver location.

The system described above requires at least three base units. This complicates the system as an outdoor installation needs to power any unit that is remote to an AC power source. This likely requires that one or more of the base units operate on underground wires or DC power, which is inconvenient if rechargeable, or expensive if primary cells are used. Also, the inclusion of three base units greatly increases the cost of a system.

Figure 5:
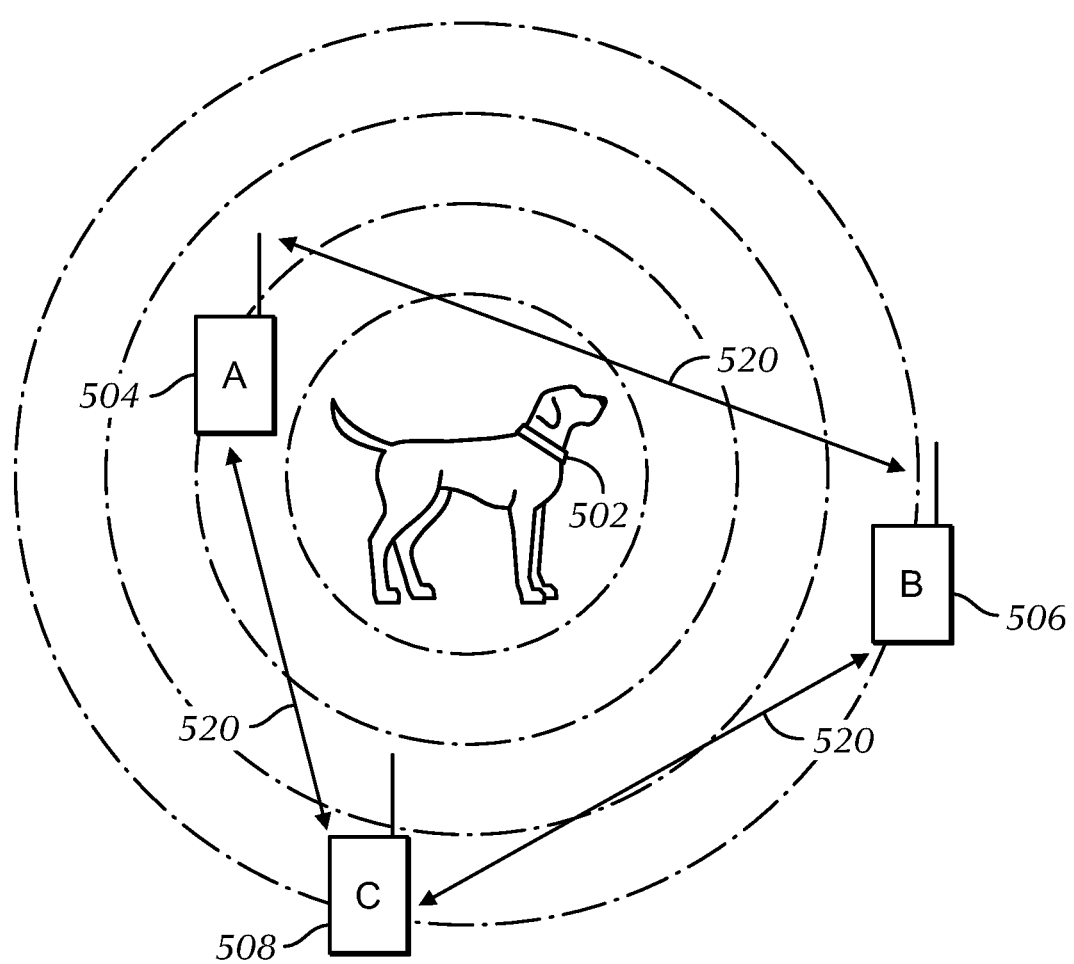
FIG. 5 shows a transceiver of a pet collar communicating with base units, under an embodiment.

A wireless animal location system may use time difference of arrival calculations under an embodiment. FIG. 5 shows an animal worn transceiver 502 in range of three transmitting base units 504, 506, 508. The base units 504, 506, 508 communicate 520 with each other to synchronize their respective clocks. The pet collar transceiver 502 periodically transmits RF signals. A pet collar RF transmission is received by base units 504, 506, 508. Upon reception, each base unit time stamps the received signal data. Based on the received times, a location of the pet transceiver may be resolved. Typically, the resolved location is calculated in one of the base units or a remote computer and then communicated to the animal worn transceiver as the animal worn transceiver is typically battery powered and energy conservation is a concern.

The time differential information may be used to determine the difference in distances between the target transceiver 502 and base units 504, 506, 508. The difference in distance information may then be used to determine hyperbolas representing possible locations of the transceiver. The intersection of hyperbolas is then used to locate the pet transceiver in a grid system.

FIG. 6A shows a base unit 602 and an animal worn collar housing a transceiver 604. The base unit comprises antennas 610, 612, 614. FIG. 6B displays a top down view of the base unit. FIGS. 6A & 6B together disclose that the distance between antenna 610 and antenna 614 is $d_1+d_2$. The altitude of the triangle (formed by the antennas) extending from antenna 612 is $d_3$. The distance $d_1$ may be equal to distance $d_2$ but embodiments are not so limited. Each antenna may be connected or coupled with a transceiver for sending and receiving RF communications or with a receiver for receiving communications.

Figure 7:
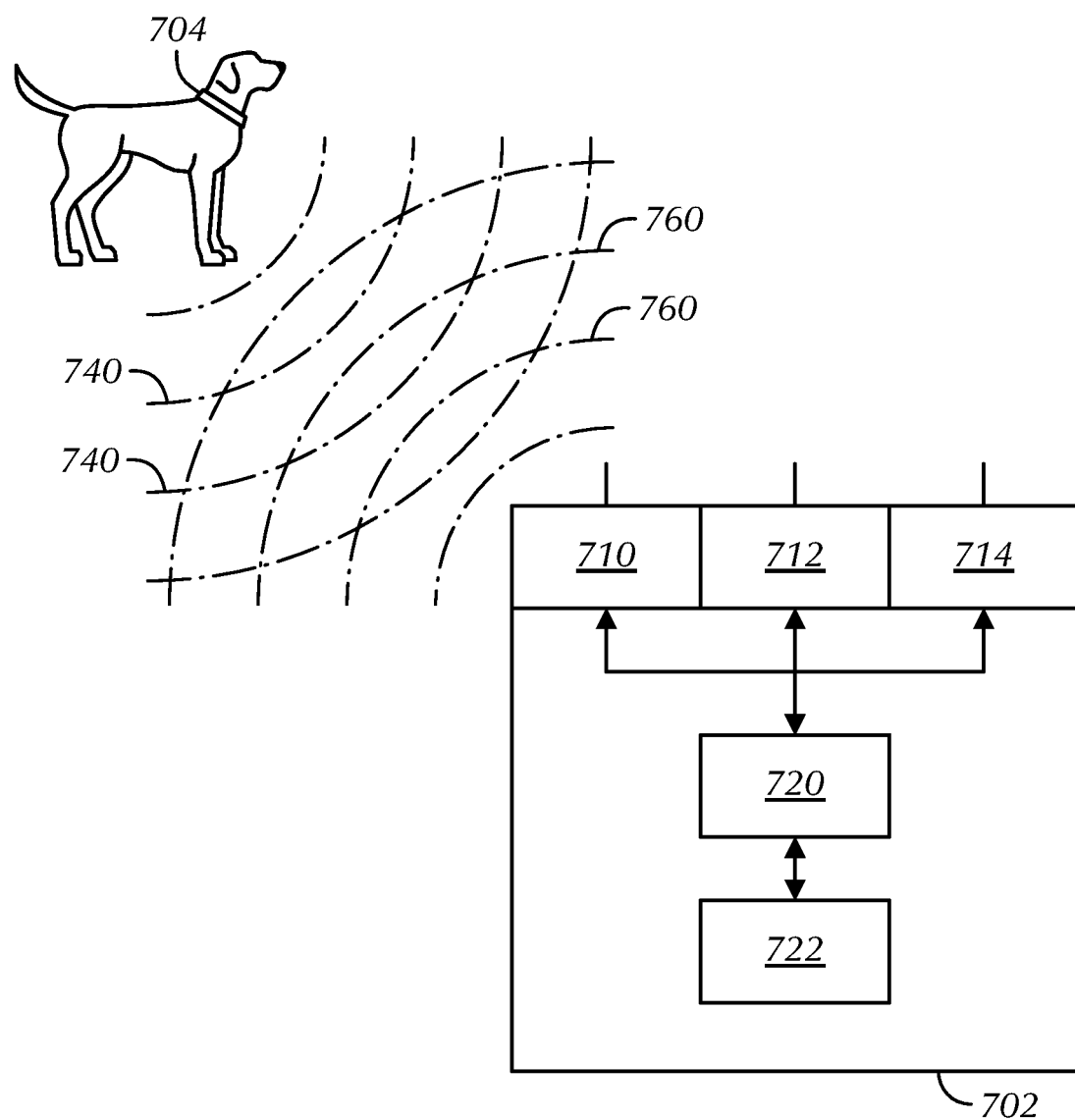
FIG. 7 shows components of a single base unit, under an embodiment.

FIG. 7 shows a stylized side view of the base unit 702 communicating with a pet transceiver 704 housed by a pet collar. The base unit couples transceiver/antenna 710, receiver/antenna 712, and receiver/antenna 714 with a processing unit 720 which is further connected/coupled to memory 722. The processing unit clocks incoming and/or outgoing communications and synchronizes the transceiver/receivers 710, 712, 714. The base unit emits an RF signal communication 740 using antenna/transceiver 710. The pet transceiver 704 processes the communication and sends a return communication 760. Each antenna unit 710, 712, 714 receives the return communication. The base unit may use two way ranging and the time differential of the return communication received at each transceiver/receiver to resolve a range and angular reference for locating the pet transceiver.

Figure 8:
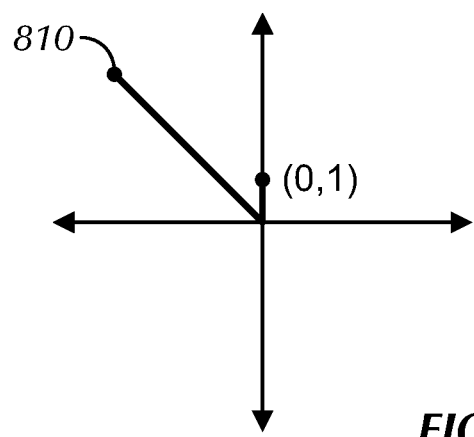
FIG. 8 shows an example of range and angular coordinates, under an embodiment.

FIG. 8 shows an example of range and angular reference location. FIG. 8 shows an x-y Cartesian coordinate system. The point 810 is located 22 meters from (0,0) and is offset from unit vector (0,1) by 310 degrees (when the angular degree value represents a clockwise rotation of 310 degrees). The range and angular coordinates are then expressed as (22 m, 310 degrees). This coordinate system may be more formally described as a polar coordinate system. A polar coordinate system is a two-dimensional coordinate system in which each point on a plane is determined by a distance from a reference point, i.e. range value, and an angle from a reference direction, i.e. an angular value. The range and angular information may be mapped into Cartesian coordinates as follows:

$$x=22*\cos(140°)=-16.85$$

$$y=22*\sin(140°)=14.14$$

Figure 9:
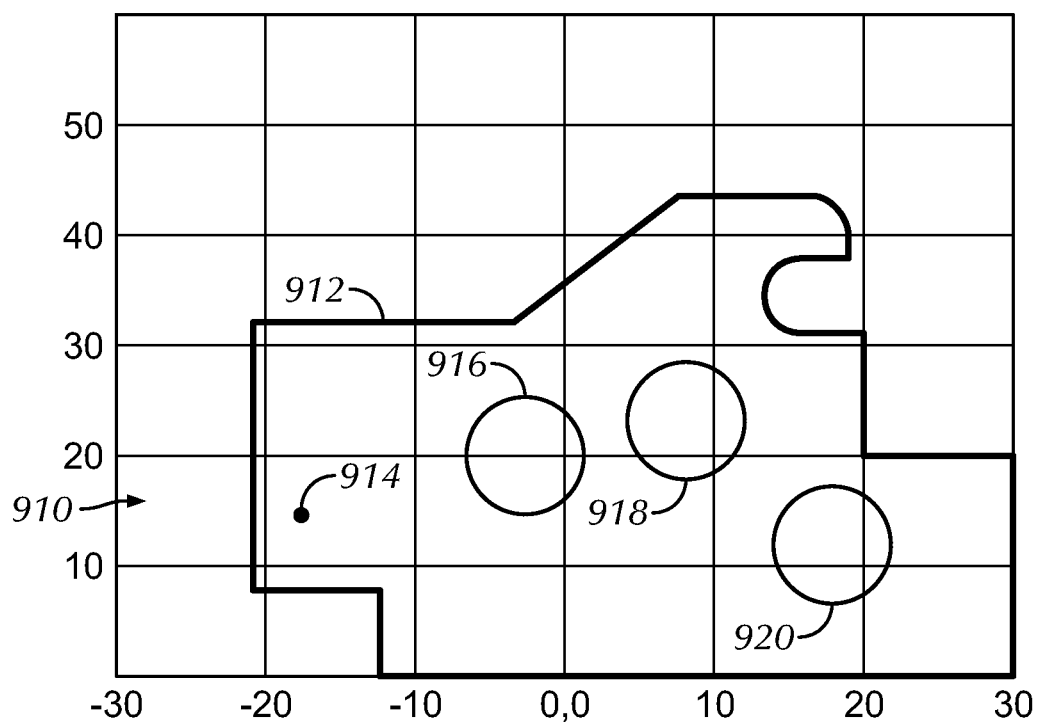
FIG. 9 shows a function grid superimposed over a monitored area, under an embodiment.

FIG. 9 shows a grid superimposed over the monitored area. Each square in the grid corresponds to a set of (range, angular) locations or (x,y) coordinates. Each grid square and corresponding (range, angular) locations may be assigned particular functions. Of course, grid assignments are not restricted to square or rectangular areas. Grid assignments may be assigned to grid portions (i.e. circular, elliptical, manually defined, etc.) and corresponding (range, angular) or (x,y) coordinates.

A grid portion or collection of grid portions may comprise a correction region (i.e. stimulus applied to pet in such region), a keep out region, a containment area, or a notification area. A base unit may transmit appropriate commands to the pet collar when the base unit locates the collar in corresponding grid portions. For example, the base unit may instruct the collar to apply a negative stimulus when the animal is in location 910. The base unit may instruct the collar take no action (or otherwise provide no instruction to take any action) when the animal is at location 914 within containment area 912. The base unit may instruct the collar to apply a negative stimulus when the animal is within a keep out region 916. The base unit may instruct the collar to log the location of the animal when the animal is within location areas 918, 920. Note that a keep out region or a notification region may be assigned to locations within a region that is a general containment area and in which no instruction is generally provided to the animal. This is possible due to the fact that specific areas within the monitored environment may be specifically associated with a function. In this way monitored environment areas 910 and 916 map to a corrective function and monitored environment areas 918, 920 map to logging/notification functions. Under an embodiment, a containment area may simply be all areas in the monitored environment not assigned a correction function.

Figure 10:
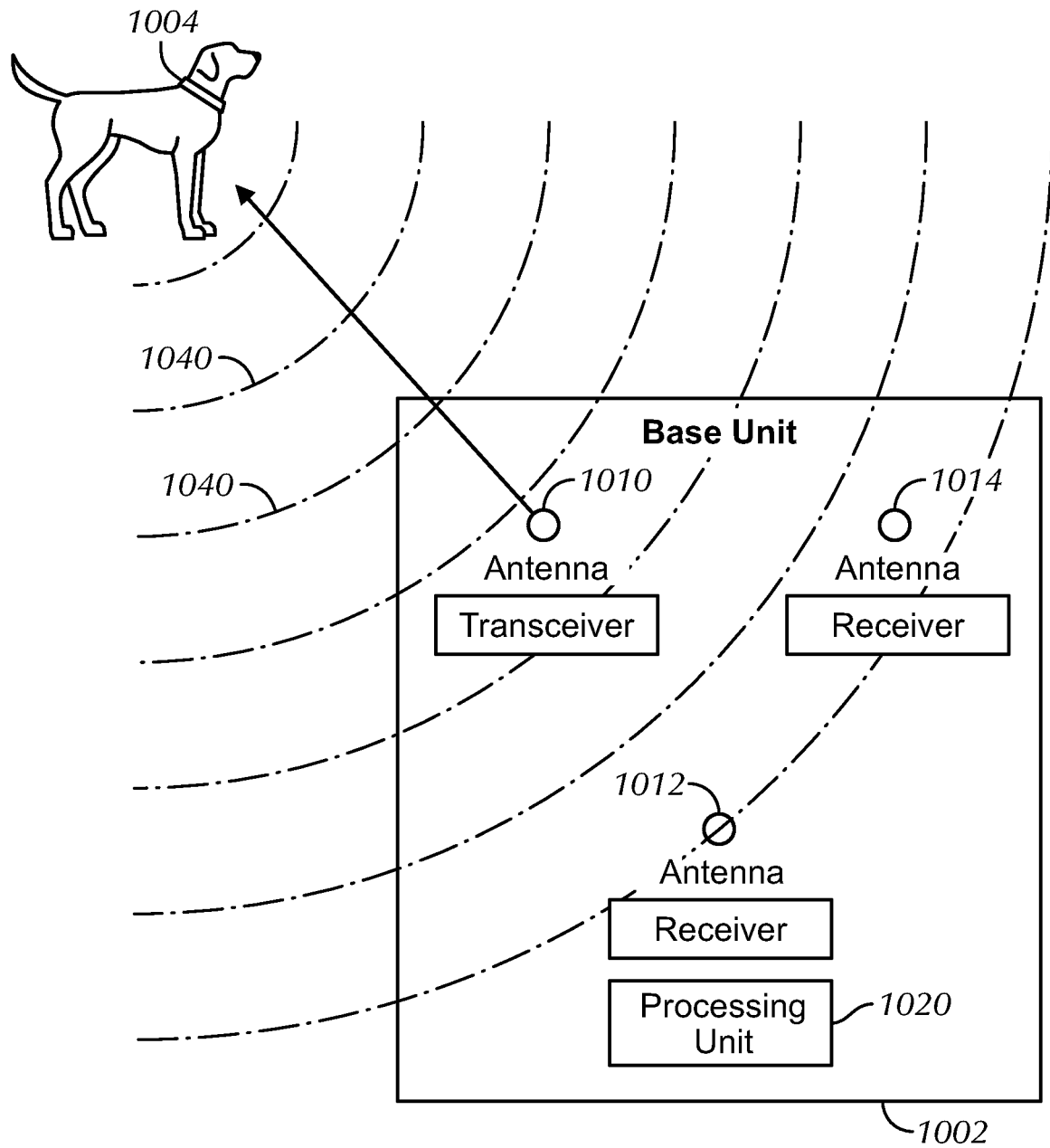
FIG. 10 shows a transceiver of a pet collar communicating with a single base unit, under an embodiment.

FIG. 10 shows a top down view of a base unit 1002 communicating with a pet transceiver 1004 housed by a pet collar. The base unit couples transceiver/antenna 1010, receiver/antenna 1012, and receiver/antenna 1014 with a processing unit 1020 which is further connected or coupled to memory (as shown in FIG. 7). The transceiver/antenna 1010, receiver/antenna 1012, and receiver/antenna 1014 may form vertices of an equilateral triangle with sides of 20 cm under one embodiment. The processing unit clocks incoming and/or outgoing communications and synchronizes the transceiver/receivers 1010, 1012, 1014. The base unit emits an RF signal communication (not represented in FIG. 10) using antenna/transceiver 1010. The pet transceiver processes the communication and sends a return communication 1040. Each antenna unit receives the return communication. As further described below, the base unit may use time of flight information received and processed through antenna/transceiver 1010 and time differential of the return communication received at each base unit antenna to resolve a range and angular reference for locating the pet transceiver. A detailed example of this method is provided below.

The transceiver/antenna 1010 transmits an RF message or communication at time 0 seconds. The pet transceiver receives the first pulse of the communication at 66.7128 ns. The pet transceiver then processes the message and develops a response. The pet transceiver transmits the response at 1000 ns. The base unit transceiver/antenna 1010 receives the first pulse of the communication at 1066.7128 ns. The base unit receiver/antenna 1014 receives the first pulse of the communication at 1067.18648 ns. The base unit receiver/antenna 1012 receives the first pulse of the communication at 1067.3572 ns. Note that the data disclosed in this paragraph corresponds to the example set forth below with respect to FIG. 13.

This process collects key information for resolution of a range and angular value for locating the pet transceiver. First, the process reveals the order in which base unit antennas 1010, 1012, 1014 receive the return transmission from the pet transceiver. Second, the process reveals a return time differential between base unit antennas. Continuing with the example set forth above the receive time differential between transceiver/antenna 1010 and receiver/antenna 1014 is 0.47368 ns. Third, the process provides range information. The time of flight between transmission of the response communication and receipt thereof by transceiver/antenna 1010 with respect to the example set forth above comprises 66.7128 ns corresponding to a distance of 20 meters from transceiver/antenna 1010 to pet transceiver. This information may be used to determine range and angular values for locating the pet using a far field model as further described below. Again note that the data disclosed in this paragraph corresponds to the example set forth below with respect to FIG. 13. In addition, the antennas 1010, 1012, 1014 form an equilateral triangles with sides of 20 cm with respect to all of the examples set forth below (see FIGS. 12-14 and corresponding examples).

Under one embodiment, a far field model may determine range and angular values using two way ranging and time difference of arrival computations set forth above. The far field model is based on the fact that the distance from base unit to pet transceiver is significantly farther than the distance between transceiver/receivers of the base unit. This model allows a spherical wave to be approximated by a plane.

The far field model implements the following steps:

Use time of flight information to determine a distance from transceiver/antenna to pet transceiver.

Determine the first two antennas to receive a return transmission from a pet transceiver.

Use the information of the first two receiving antennas to determine an approximate "quadrant" region surrounding the pet (as further shown in FIG. 11 below).

Determine a time difference of arrival between the two first antennas.

Use equations based on an identified region (see FIG. 11 below) to determine angular information. The examples set forth below adopt the base unit configuration of FIG. 10. Further, the examples set forth below assume that the line between antenna 1010 and 1014 represents the reference line for angular values. It is further noted that angular values (in the examples provided below) extend from the reference line in a counter clockwise direction.

Figure 11:
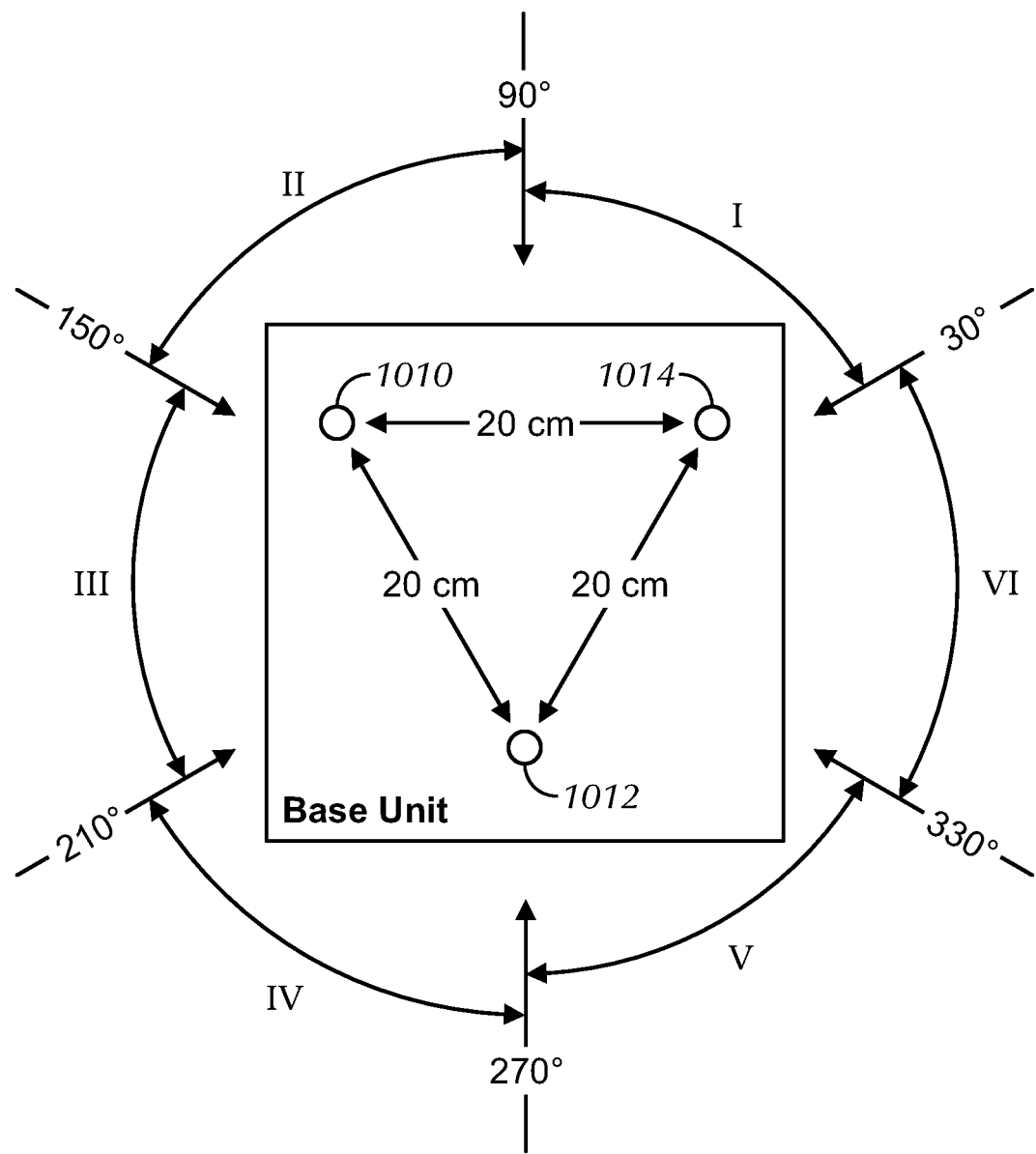
FIG. 11 shows a division of space surrounding a single base unit into quadrants, under an embodiment.

FIG. 11 shows an example of quadrant determination based on the time of arrival among antennas. The example shown in FIG. 11 is based on an implementation utilizing a base unit consisting of three transceiver/receivers positioned as an equilateral triangle, although the number and position of transceiver/receivers are not limited to these arrangements. FIG. 11 shows Quadrants I-VI and corresponding order of reception among antennas:

Quadrant I (30-90 degrees): first reception 1014, second reception 1010

Quadrant II (90-150 degrees): first reception 1010, second reception 1014

Quadrant III (150-210 degrees): first reception 1010, second reception 1012

Quadrant IV (210-270 degrees): first reception 1012, second reception 1010

Quadrant V (270-330 degrees): first reception 1012, second reception 1014

Quadrant VI (330-30 degrees): first reception 1014, second reception 1012

As demonstrated by the partitioning of planar space in FIG. 11, order of reception limits the location of the pet transceiver to a particular quadrant or angular region.

Figure 12:
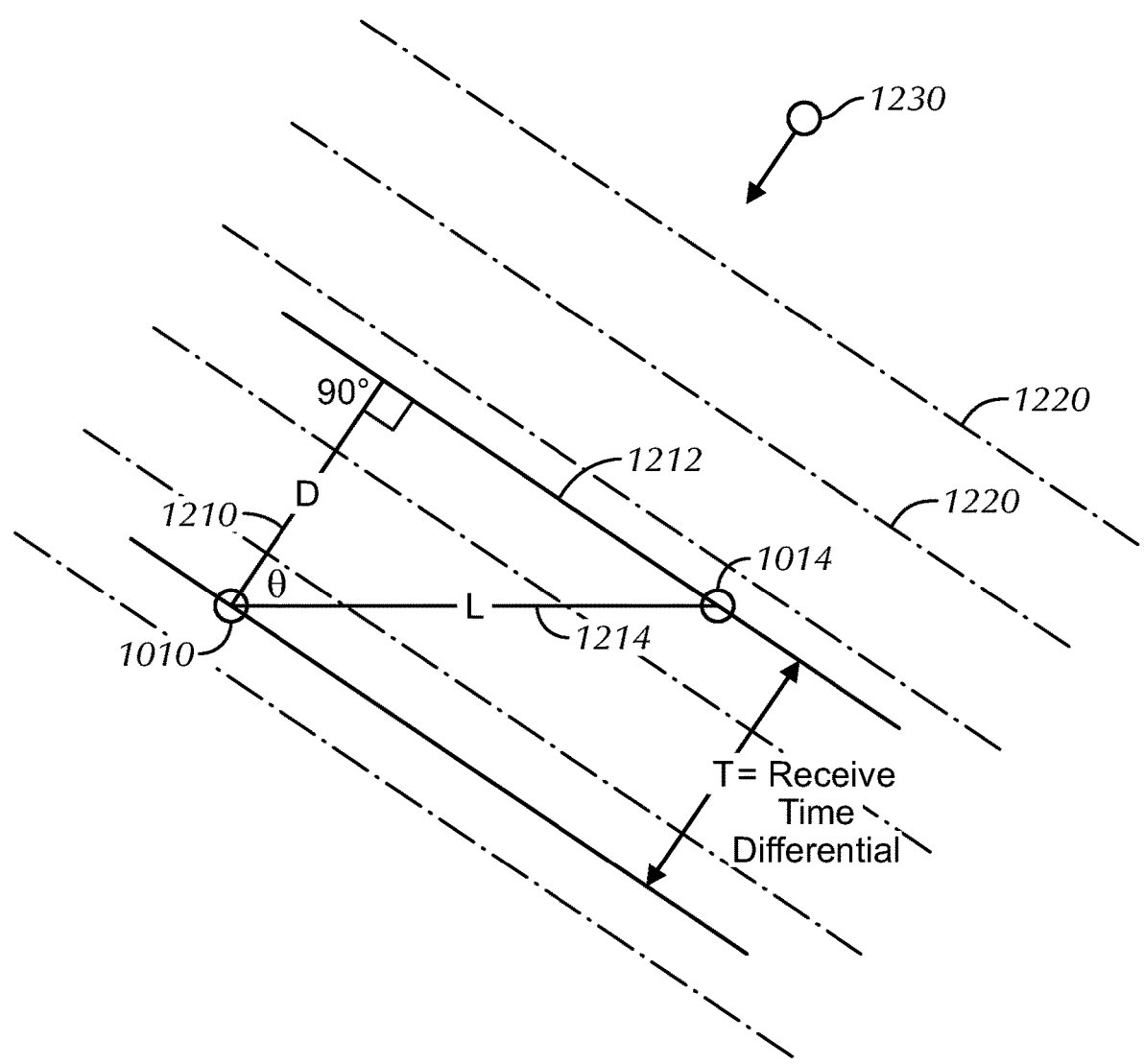
FIG. 12 shows a sample computation of an angular value, under an embodiment.

FIG. 12 shows a computation of an angular value with respect to a pet location. FIG. 12 show a return RF transmission 1220 from a pet transceiver 1230 located in quadrant I. This is known due to first reception at antenna 1014 and second reception at antenna 1010. Under the far field model, antenna 1010 and 1014 are vertices of a triangle with side 1210 oriented in the general direction of the pet transceiver. The far field model approximates the angle between side 1210 and side 1212 as a ninety (90) degree angle. Again this is possible because the distance between antennas is significantly less than the distance between antennas and pet transceiver. The length L of the line 1214 between antenna 1010 and antenna 1014 is known at 20 cm.

FIG. 12 shows the angle θ between lines 1210 and 1214. The length of side 1210 (i.e., the value of D as shown in FIG. 12) may then be computed as follows:

D=CT

C=speed of RF signal from pet transceiver

T=receive time differential between antennas 1010, 1014

Once D is known, there is enough information to solve for θ (as described in greater detail below) and thereby determine an angular value.

Figure 13:
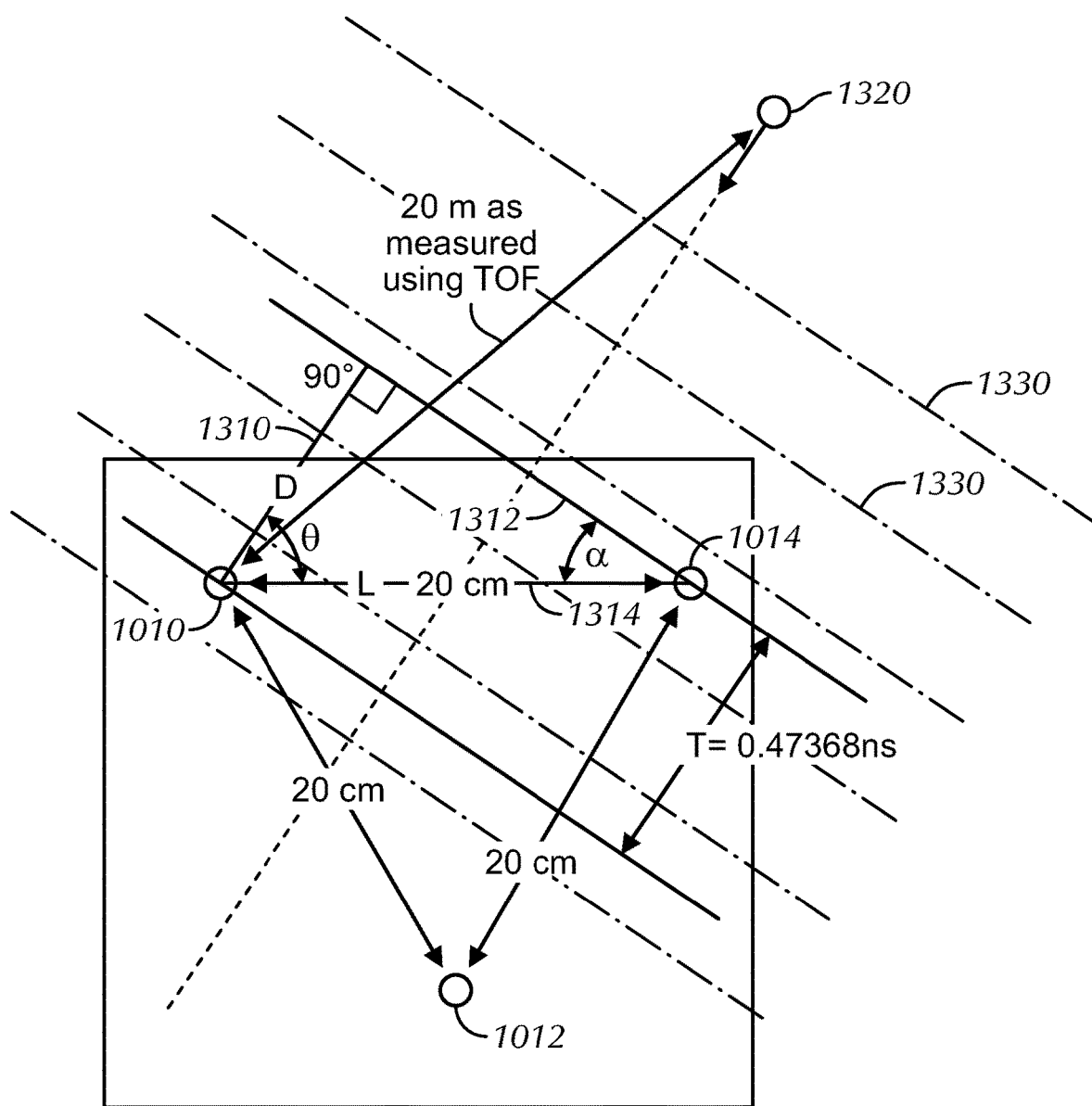
FIG. 13 shows a sample computation of an angular value, under an embodiment.

FIG. 13 shows an example of a base unit receiving a transmission 1330 from pet transceiver 1320 in Quadrant I. This is known due to first reception at antenna 1014 and second reception at antenna 1010. The time of flight and corresponding distance between antenna 1010 and pet transceiver 1320 is 66.7128 ns and 20 m. Antenna 1010 and 1014 form vertices of a triangle with side 1310 oriented in the general direction of the pet transceiver. The angle between sides 1310 and 1312 is approximated as 90 degrees under the far field model. The length of side 1314 is known at 20 cm. The time differential between antennas 1010 and 1014 is 0.47368 ns. The length D of side 1310 may now be computed. Further, the value of θ may be calculated by first computing the value of α as follows:

$$\alpha = \sin^{-1}\left(\frac{CT}{L}\right) = \sin^{-1}\left[\frac{\left(\frac{30\text{ cm}}{\text{ns}}\right)*(.47368\text{ ns})}{20\text{ cm}}\right] = \sin^{-1}[.71052]$$

$$\alpha = 45.278°$$

$$\theta = 180° - 90° - 45.278° = 44.723°$$

Therefore the location of the pet may be approximated with a range, angular value of (20 m, 44.723).

Figure 14:
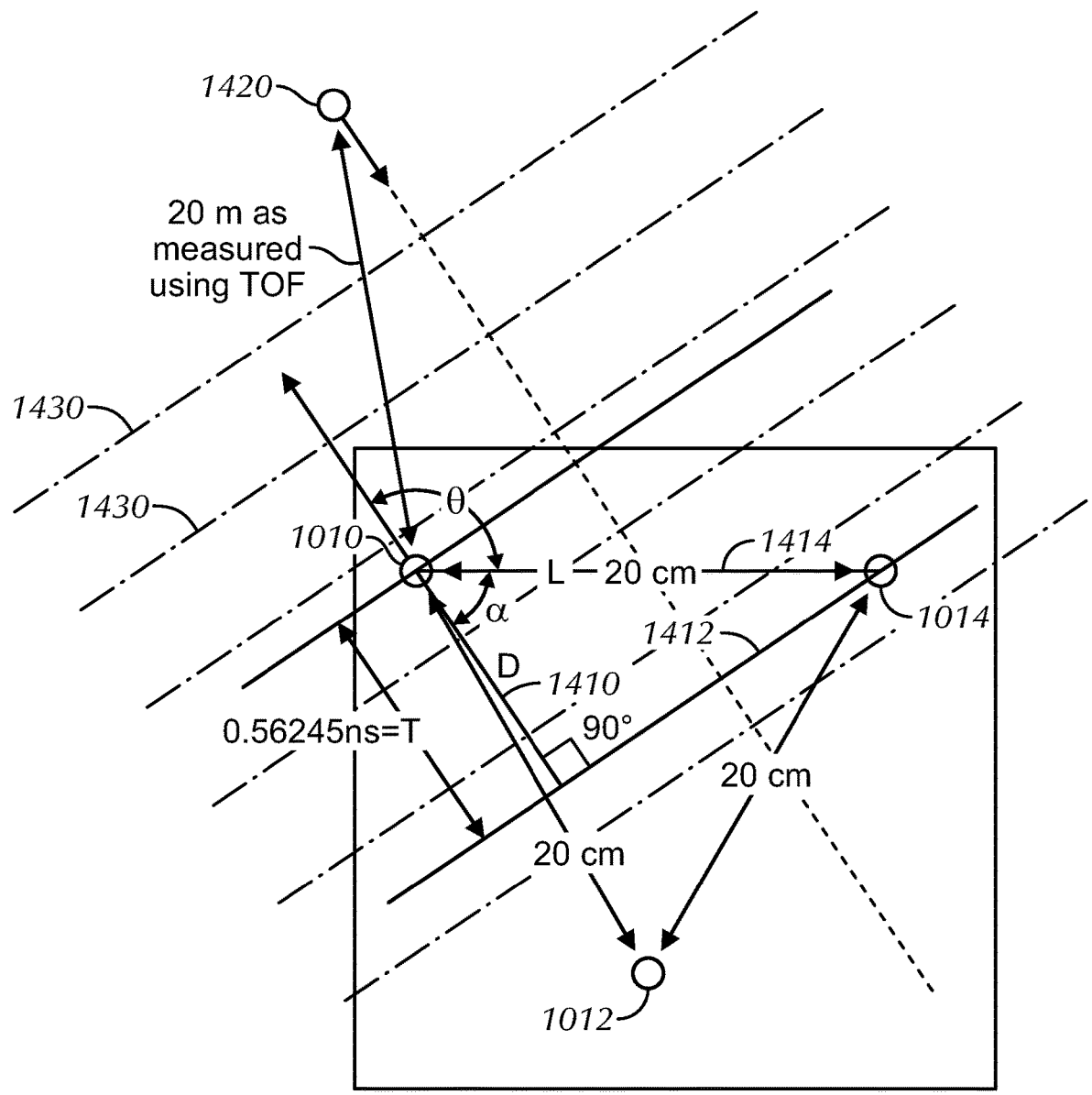
FIG. 14 shows a sample computation of an angular value, under an embodiment.

FIG. 14 shows an example of a base unit receiving a transmission 1430 from pet transceiver 1420 in Quadrant II. This is known due to first reception at antenna 1010 and second reception at antenna 1014. It is assumed the time of flight between pet transceiver 1420 and antenna 1010 indicates a distance of 20 m. Antenna 1010 and 1014 form vertices of a triangle with side 1410 oriented in the general direction of the pet transceiver. The angle between sides 1410 and 1412 is approximated as 90 degrees under the far field model. The length of side 1414 is known at 20 cm. The time differential between antennas 1010 and 1014 is 0.56245 ns. The length D of side 1410 may now be computed. The value of θ may be calculated by first computing the value of α as follows:

$$\alpha = \cos^{-1}\left(\frac{CT}{L}\right) = \cos^{-1}\left[\frac{\left(\frac{30\text{ cm}}{\text{ns}}\right)*(.56245\text{ ns})}{20\text{ cm}}\right] = 32.47°$$

$$\alpha = 32.47°$$

$$\theta = 180° - \alpha = 180° - 32.47° = 147.53°$$

Therefore the location of the pet may be approximated with a range, angular value of (20 m, 147.53).

Figure 15:
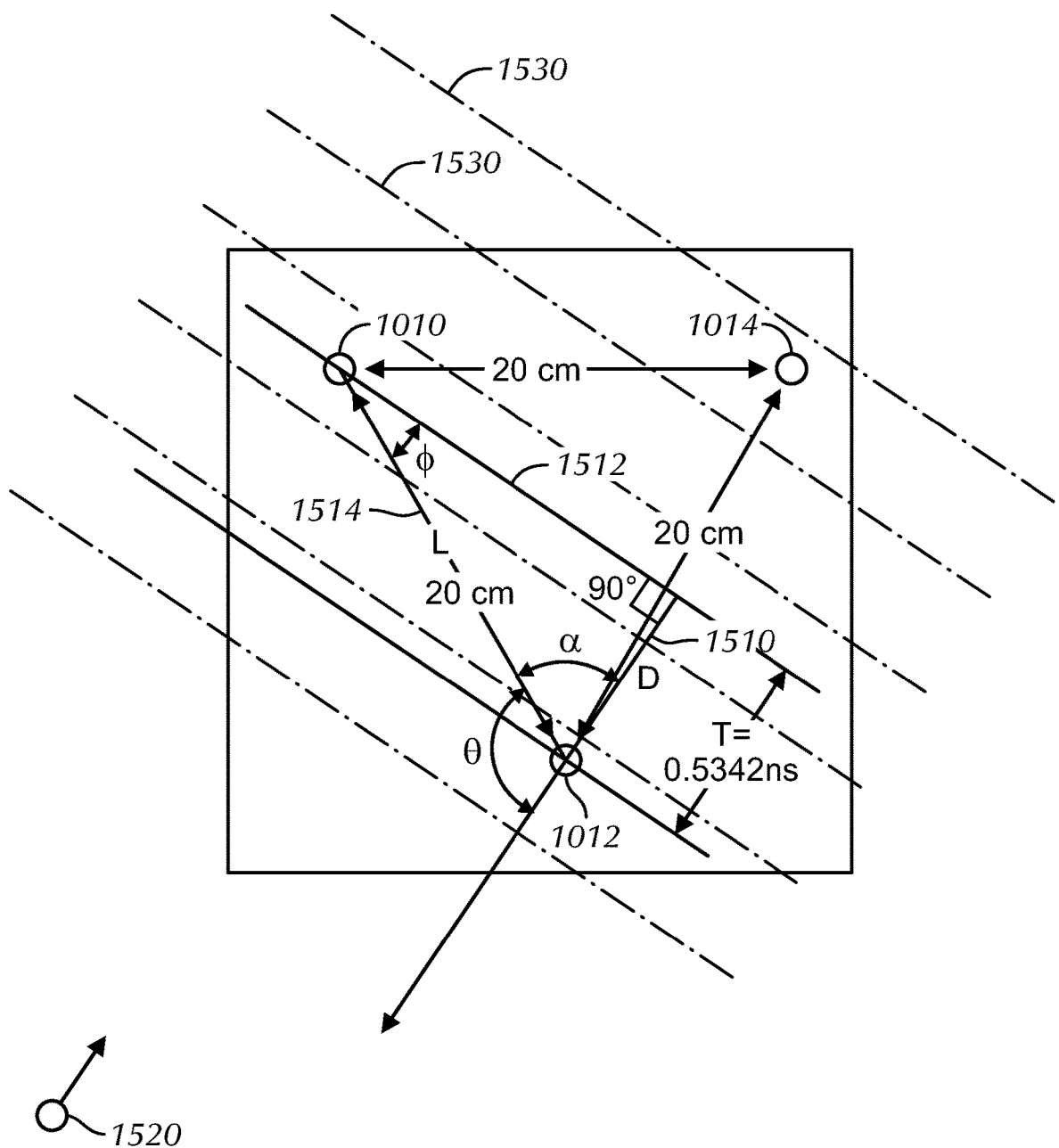
FIG. 15 shows a sample computation of an angular value, under an embodiment.

FIG. 15 shows an example of a base unit receiving a transmission 1530 from pet transceiver 1520 in Quadrant III. This is known due to first reception at antenna 1012 and second reception at antenna 1010. It is assumed the time of flight between pet transceiver 1520 and antenna 1012 indicates a distance of 20 m. Antenna 1010 and 1012 form vertices of a triangle with side 1510 oriented in the general direction of the pet transceiver. The angle between sides 1510 and 1512 is approximated as 90 degrees under the far field model. The length of side 1514 is known at 20 cm. The time differential between antennas 1010 and 1012 is 0.5342 ns. The length D of side 1510 may now be computed. Further, the value of θ may be calculated by first computing the value of Ø and α as follows:

$$\emptyset = \sin^{-1}\left(\frac{CT}{L}\right) = \sin^{-1}\left[\frac{\left(\frac{30\text{ cm}}{\text{ns}}\right)*(.5342\text{ ns})}{20\text{ cm}}\right] = \sin^{-1}[.8013] = 53.25°$$

$$\alpha = 180° - 90° - 53.25° = 36.75°$$

$$\theta = 180° - 36.75° = 143.25°$$

Therefore the location of the pet may be approximated with a range, angular value of (20 m, 263.25). In this case, it is known based on time differential that the pet transceiver is located in Quadrant III. This means that θ is computed with respect to antennas 1010 and 1012. Therefore, the angular value must be approximated by adding 120° such that the angular value sweeps through Quadrant I and Quadrant II and then an additional 143.25° through Quadrant III. In like manner, angular estimates for the pet transceiver in quadrants IV, V, and VI should add 180°, 240°, and 300° respectively.

It should be further noted that angle computations are applied according the detected position of the pet transceiver. As indicated above, it is known based on receive time differentials that the pet transceiver is located in one of Quadrants I-VI. As one example, the pet transceiver may be located in Quadrant V. Therefore, a known computation may be applied to determine an angular location of the animal with respect to a line between antennas 1012 and 1014. Assuming the facts set forth above with respect to FIGS. 12-16, an additional 240 degrees is then added to the angular estimate. The pet transceiver is then located at the adjusted angular estimate (with respect to the line between antennas 1010 and 1014, i.e. the zero angular reference) and approximately 20 meters from the base unit.

The examples presented above utilize three antennas in an equilateral triangle configuration, however this is not a limitation as the number of antennas can be any number greater than three, or greater than two if a physical limitation exists to block 180 degrees of the coverage of the area. Further, the configuration of antennas is not limited to any specific trigonometric configuration.

It should be noted that the time difference of arrival among transceiver/antennas and/or receiver/antennas may be determined by the difference in phase of the carrier signal of an incoming signal.

Three dimensional positional resolution can also be performed. It can be treated as two separate two-dimensional position resolutions in two perpendicular planes as long as there are positional differences between the antennas in the two planes.

A device is described that comprises under an embodiment a base unit including a first transceiver, a second receiver, and a third receiver, wherein the first transceiver comprises a first antenna, the second receiver comprises a second antenna, and the third receiver comprises a third antenna, wherein the first transceiver, the second receiver, and the third receiver are communicatively coupled with at least one processor of the base unit, wherein the base unit comprises a clock that synchronizes communications of the first transceiver, the second receiver, and the third receiver, wherein the first transceiver, the second receiver, and the third receiver comprise vertices of a triangle. The base unit includes the first transceiver configured to transmit a communication to a transceiver remote to the base unit. The base unit includes the first transceiver, the second receiver, and the third receiver configured to receive a response from the transceiver, wherein the response comprises a return communication. The base unit includes the at least one processor configured to use information of the return communication to determine a first time of flight, wherein the first time of flight comprises the time elapsed between transmission of the return communication and the receiving of the return communication by the first transceiver. The base unit includes the at least one processor configured to use the first time of flight to determine a first distance between the first transceiver and the transceiver. The base unit includes the at least one processor configured to use the clock to determine a time difference of arrival between the first transceiver receiving the return communication, the second receiver receiving the return communication, and the third receiver receiving the return communication. The base unit includes the at least one processor configured to determine an angular value using information of the time difference of arrival, the relative positioning of the first antenna, the second antenna, and the third antenna and signal transmission speed of the return communication, wherein the angular value comprises an angle between a reference direction and an axis, wherein the angular value and the first distance approximate a location of the transceiver.

The triangle of an embodiment comprises an equilateral triangle.

Sides of the equilateral triangle are equal to or less than 20 cm, under an embodiment.

The at least one processor of an embodiment is configured to determine the time difference of arrival using the difference in phase of a carrier signal of the return communication among the first transceiver, the second receiver, and the third receiver.

The reference direction of an embodiment comprises a fixed unit vector originating at a vertex of the triangle and extending along a side of the triangle.

The vertices of the triangle approximately define a plane, wherein a plurality of quadrants partition the plane into radial segments extending from the base unit, under an embodiment.

The information of the time difference of arrival comprises an order of reception between the initial two antennas receiving the return communication, under an embodiment.

The determining the angular value includes using the order of reception between the initial two antennas to locate the transceiver in a quadrant of the plurality of quadrants, under an embodiment.

The determining the angular value includes under an embodiment constructing a right triangle, wherein the initial two antennas comprise vertices of the right triangle, wherein a first side of the right triangle is oriented in a direction of the transceiver in the quadrant, wherein a second side comprises a line between the initial two antennas.

The determining the angular value includes under an embodiment determining a first length of the first side using the signal transmission speed and the time difference of arrival between the initial two antennas receiving the return communication.

A second length comprises a length of the second side, under an embodiment.

The determining the angular value comprises under an embodiment determining the angular value using the first length, the second length, and information of the quadrant.

The transceiver of an embodiment is communicatively coupled with a stimulus unit positioned in a collar worn by an animal.

The at least one processor of an embodiment is configured to identify at least one instruction using the first distance and the angular value.

The at least one instruction of an embodiment includes logging the first distance and the angular value.

The identifying the at least one instruction includes transmitting the at least one instruction to the transceiver, under an embodiment.

The at least one instruction includes an instruction to apply a positive stimulus, under an embodiment.

The at least one instruction includes an instruction to apply a negative stimulus, under an embodiment.

A device is described that comprises under an embodiment a base unit including at least three transceivers, wherein the at least three transceivers are communicatively coupled with at least one processor of the base unit, wherein the base unit comprises a clock that synchronizes communications of the at least three transceivers. The device includes a first transceiver of the at least three transceivers configured to transmit a communication to a transceiver remote to the base unit. The device includes the at least three transceivers configured to receive a response from the transceiver, wherein the response comprises a return communication. The device includes the at least one processor configured to use information of the return communication to determine a first time of flight, wherein the first time of flight comprises the time elapsed between transmission of the return communication and the receiving of the return communication by the first transceiver. The device includes the at least one processor configured to use the first time of flight to determine a first distance between the first transceiver and the transceiver. The device includes the at least one processor configured to use the clock to determine a time difference of arrival among the at least three transceivers receiving the return communication. The device includes the at least one processor configured to determine an angular value using information of the time difference of arrival, the relative positioning of the at least three transceivers and signal transmission speed of the return communication, wherein the angular value comprises an angle between a reference direction and an axis, wherein the angular value and the first distance approximate a location of the transceiver.

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The wireless pet containment system using a single base unit can be a component of a single system, multiple systems, and/or geographically separate systems. The wireless pet containment system using a single base unit can also be a subcomponent or subsystem of a single system, multiple systems, and/or geographically separate systems. The components of wireless pet containment system using a single base unit can be coupled to one or more other components (not shown) of a host system or a system coupled to the host system.

One or more components of the wireless pet containment system using a single base unit and/or a corresponding interface, system or application to which the wireless pet containment system using a single base unit is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the wireless pet containment system using a single base unit can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the wireless pet containment system using a single base unit and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the wireless pet containment system using a single base unit and corresponding systems and methods include: microcontrollers with memory (such as electronically erasable programmable read only memory (EEPROM)), embedded microprocessors, firmware, software, etc. Furthermore, aspects of the wireless pet containment system using a single base unit and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the wireless pet containment system using a single base unit is not intended to be exhaustive or to limit the systems and methods to the precise forms disclosed. While specific embodiments of, and examples for, the wireless pet containment system using a single base unit and corresponding systems and methods are described herein for illustrative purposes, various equivalent modifications are possible within the scope of the systems and methods, as those skilled in the relevant art will recognize. The teachings of the wireless pet containment system using a single base unit and corresponding systems and methods provided herein can be applied to other systems and methods, not only for the systems and methods described above.

The elements and acts of the various embodiments described above can be combined to provide further embodiments. These and other changes can be made to the wireless pet containment system using a single base unit and corresponding systems and methods in light of the above detailed description.

I claim:

1. A method comprising,
a clock synchronizing communications of at least three transceivers, wherein each transceiver of the at least three transceivers includes an antenna, wherein the at least three transceivers occupy a plane;
a first transceiver of the at least three transceivers transmitting a communication to a remote transceiver;
the at least three transceivers receiving a response to the communication from the remote transceiver, wherein the response comprises a return communication;
using information of the return communication to determine a first time of flight, wherein the first time of flight comprises the time elapsed between transmission of the return communication and the receiving of the return communication by the first transceiver;
using the first time of flight to determine a first distance between the first transceiver and the remote transceiver;
using the clock to determine a time difference of arrival of the return communication between the first transceiver of the at least three transceivers and the remaining receivers of the at least three transceivers;
determining an angular value using information of the time difference of arrival, the relative positioning of the at least three transceivers, and signal transmission speed of the return communication, wherein the angular value comprises an angle between a reference direction and an axis, wherein the reference direction comprises a fixed unit vector originating at a location of a transceiver of the at least three transceivers, wherein the information of the time difference of arrival includes an order of reception between an initial two transceivers of the at least three transceivers receiving the return communication, wherein the angular value and the first distance approximate a location of the transceiver.

2. The method of claim 1, wherein the at least three transceivers include three transceivers comprising vertices of an equilateral triangle.

3. The method of claim 2, wherein sides of the equilateral triangle are equal to or less than 20 cm.

4. The method of claim 2, wherein the reference direction comprises a fixed unit vector originating at a vertex of the triangle and extending along a side of the triangle.

5. The method of claim 4, wherein a plurality of quadrants partition the plane into radial segments extending from the base unit.

6. The method of claim 5, comprising using the order of reception to estimate a first location of the remote transceiver in the plane.

7. The method of claim 6, wherein the estimated first location comprises a location of the remote transceiver in a quadrant of the plurality of quadrants.

8. The method of claim 7, the determining the angular value including constructing a right triangle, wherein the initial two antennas comprise vertices of the right triangle, wherein a first side of the right triangle is oriented in a direction of the remote transceiver in the quadrant, wherein a second side comprises a line between the initial two antennas.

9. The method of claim 8, the determining the angular value including determining a first length of the first side using the signal transmission speed and the time difference of arrival between the initial two antennas receiving the return communication.

10. The method of claim 9, wherein a second length comprises a length of the second side.

11. The method of claim 10, the determining the angular value comprising determining the angular value using the first length, the second length, and information of the quadrant.

12. The method of claim 1, wherein the remote transceiver is communicatively coupled with a stimulus unit positioned in a collar worn by an animal.

13. The method of claim 12, comprising identifying at least one instruction using the first distance and the angular value.

14. The method of claim 13, the at least one instruction including logging the first distance and the angular value.

15. The method of claim 14, the identifying the at least one instruction including transmitting the at least one instruction to the remote transceiver.

16. The method of claim 15, the at least one instruction including an instruction to apply a positive stimulus.

17. The method of claim 16, the at least one instruction including an instruction to apply a negative stimulus.

18. The method of claim 1, the determining the time difference of arrival comprising using a difference in phase of a carrier signal of the return communication among the at least three transceivers to determine the time difference of arrival.

19. A method comprising,
a clock synchronizing communications of a first transceiver, a second receiver, and a third receiver, wherein the first transceiver comprises a first antenna, the second receiver comprises a second antenna, and the third receiver comprises a third antenna, wherein the first transceiver, the second receiver, and the third receiver occupy a plane;
the first transceiver transmitting a communication to a remote transceiver;
the first transceiver, the second receiver, and the third receiver receiving a response from the remote transceiver, wherein the response comprises a return communication;
using information of the return communication to determine a first time of flight, wherein the first time of flight comprises the time elapsed between transmission of the return communication and the receiving of the return communication by the first transceiver;
using the first time of flight to determine a first distance between the first transceiver and the remote transceiver;
using the clock to determine a time difference of arrival between the first transceiver receiving the return communication, the second receiver receiving the return communication, and the third receiver receiving the return communication;
using information of the time difference of arrival to determine an order of reception between an initial two antennas of the first antenna, the second antenna, and the third antenna receiving the return communication;
using the order of reception to estimate a first location of the remote transceiver in the plane;

determining an angular value using information of the time difference of arrival, the relative positioning of the first antenna, the second antenna, and the third antenna, signal transmission speed of the return communication, and the estimated first location, wherein the angular value comprises an angle between a reference direction and an axis, wherein the reference direction comprises a fixed unit vector originating at a location of at least one of the first antenna, the second antenna, and the third antenna, wherein the angular value and the first distance approximate a location of the remote transceiver.

\* \* \* \* \*